US012751888B2

(12) United States Patent
Dong

(10) Patent No.: US 12,751,888 B2
(45) Date of Patent: Oct. 6, 2026

(54) MASSAGING SHOWER

(71) Applicant: Huang Zhong Dong, Shenzhen (CN)

(72) Inventor: Huang Zhong Dong, Shenzhen (CN)

( * ) Notice: Subject to any disclaimer, the term of this patent is extended or adjusted under 35 U.S.C. 154(b) by 0 days.

(21) Appl. No.: 18/794,642

(22) Filed: Aug. 5, 2024

(65) Prior Publication Data

US 2026/0034020 A1 Feb. 5, 2026

(51) Int. Cl.

| | |
|---|---|
| ***A61H 23/02*** | (2006.01) |
| ***A47K 7/04*** | (2006.01) |
| ***A61H 9/00*** | (2006.01) |

(52) U.S. Cl.

CPC ........... *A61H 9/0021* (2013.01); *A47K 7/046* (2013.01); *A61H 23/02* (2013.01); *A61H 2201/0107* (2013.01); *A61H 2201/1671* (2013.01); *A61H 2201/1695* (2013.01)

(58) Field of Classification Search

CPC .................. A61H 9/0021; A61H 23/02; A61H 2201/0107; A61H 2201/1671; A61H 2201/1695; A61H 2201/1692; A61H 9/00; A61H 9/007; A61H 9/0028; A61H 9/005; A61H 9/0071; A61H 9/002; A61H 9/003; A61H 9/004; A61H 9/0057; A61H 2009/0035; A61H 2009/0042; A61H 39/04; A61H 19/00; A61H 19/34; A61H 19/40; A61H 19/44; A61H 23/04; A47K 7/00; A47K 7/046

See application file for complete search history.

(56) References Cited

U.S. PATENT DOCUMENTS

| | | | | |
|---|---|---|---|---|
| 5,187,827 A * | 2/1993 | Wei | A47K 7/046 | 601/161 |
| 5,893,836 A * | 4/1999 | Raines | A61H 9/0021 | 601/75 |
| 6,355,009 B1 * | 3/2002 | Henkin | A61H 33/601 | 601/169 |
| 8,048,010 B2 * | 11/2011 | Ohashi | A61H 9/005 | 239/548 |
| 8,652,078 B2 * | 2/2014 | Lee | B05B 1/18 | 239/102.1 |
| 8,979,778 B2 * | 3/2015 | Faredoun | B05B 1/18 | 4/615 |

(Continued)

*Primary Examiner* — Bradley H Philips
*Assistant Examiner* — Tyler A Raubenstraw
(74) *Attorney, Agent, or Firm* — John R. Ross, III; John R. Ross

(57) ABSTRACT

The present disclosure provides a massaging shower including a shower module and a massaging module. The shower module includes an outer shell, the outer shell includes a first connecting end and a second connecting end which are arranged at two ends of the outer shell along its length direction respectively, the first connecting end includes a first connecting part, and the second connecting end connects with a shower tube. The massaging module includes a housing, a massaging assembly, an electrical controller and a battery, the massaging assembly is mounted on the housing and exposed from the housing, the electrical controller and the battery are received in the housing, the electrical controller is electrically connected to the battery and the massaging assembly, the housing includes a second connecting part which is detachably connected with the first connecting part, so that the massaging module is detachably connected with the shower module.

19 Claims, 7 Drawing Sheets

(56) References Cited

U.S. PATENT DOCUMENTS 9,393,174 B1 * 7/2016 Pope ..................... B05B 15/656
9,662,489 B1 * 5/2017 Cargill, III ......... A61N 1/36014
10,322,058 B1 * 6/2019 Patch ..................... A61H 19/30
2003/0144615 A1 * 7/2003 Lin .................... A61H 33/6057 601/112
2003/0229300 A1 * 12/2003 Winkley ............ A61H 33/6036 601/111
2004/0261171 A1 * 12/2004 Holtsnider ........... A61H 33/027 4/541.6
2005/0215926 A1 * 9/2005 Thrasher .................. A47K 7/04 601/67
2005/0279864 A1 * 12/2005 Fan ...................... A61H 9/0021 239/525
2006/0111608 A1 * 5/2006 Kennedy ................ A61H 19/44 600/38
2006/0248640 A1 * 11/2006 Leong .................. A61H 9/0021 4/597
2006/0276731 A1 * 12/2006 Thiebaut ................ A61H 7/003 601/17
2007/0022527 A1 * 2/2007 Russo .................... A47K 7/026 4/606
2009/0101734 A1 * 4/2009 Tsai ................... A61H 33/6036 239/468
2009/0124946 A1 * 5/2009 Zhadanov ................. B05B 3/04 4/615
2010/0199420 A1 * 8/2010 Lee ........................ A61H 39/00 4/601
2011/0266363 A1 * 11/2011 Lee ........................... B05B 1/18 239/102.1
2012/0159724 A1 * 6/2012 Houman ................ A46B 13/06 15/29
2014/0014743 A1 * 1/2014 Schorn ...................... B05B 1/18 239/447
2014/0107409 A1 * 4/2014 Bailey ................ A61H 23/0263 600/38
2014/0263711 A1 * 9/2014 Fraser .................... A46B 13/06 239/11
2014/0330289 A1 * 11/2014 Revivo .................. A46B 13/02 606/131
2015/0297393 A1 * 10/2015 McGushion ......... A61H 23/006 601/136
2015/0313638 A1 * 11/2015 Rosenberg ............. A61H 19/50 600/35
2016/0135582 A1 * 5/2016 Yen ...................... A46B 13/008 15/22.1
2016/0287034 A1 * 10/2016 Woodard .................. B05B 1/18
2017/0056898 A1 * 3/2017 Streetmaker ............ B05B 1/185
2017/0297039 A1 * 10/2017 Cacka ..................... B05B 1/169
2018/0153768 A1 * 6/2018 Hemmrich ............. A61K 33/00
2018/0318853 A1 * 11/2018 Lin ....................... E03C 1/0405
2019/0083354 A1 * 3/2019 Pahl ....................... A61H 9/005
2020/0069512 A1 * 3/2020 Lee .................... A61H 23/0263
2020/0085684 A1 * 3/2020 Ahn ................... A61H 23/0218
2020/0384487 A1 * 12/2020 Chang ....................... B05B 3/04
2021/0316322 A1 * 10/2021 Chang ................ A61H 33/6089
2022/0175612 A1 * 6/2022 Witt ....................... A61H 19/30
2022/0233395 A1 * 7/2022 Witt ..................... A61H 9/0057
2023/0080795 A1 * 3/2023 Raju ...................... A61H 9/005 600/38
2023/0101877 A1 * 3/2023 Quinn ..................... B05B 1/185 239/394
2024/0009688 A1 * 1/2024 Clarke .................. E03C 1/0409
2024/0074623 A1 * 3/2024 Wei ........................ A47K 7/046
2024/0226940 A1 * 7/2024 Deng .................... B05B 12/002

* cited by examiner

MASSAGING SHOWER

FIELD

The present disclosure relates to the field of showers, and in particular to a massaging shower.

BACKGROUND

With the increasing needs of users, the showers need to have massage and cleaning functions in addition to a bath function, to meet the needs of users.

In a related art, the massaging shower includes a handle body, a water outlet tray installed on the handle body, and a massaging part, the massaging part is exposed from the water outlet tray. However, the massaging part is embedded in of the water outlet tray, which makes it difficult to disassemble the massaging part. In detail, user needs to disassemble the water outlet tray from the handle body, then disassemble the massaging part from the water outlet tray. Therefore, it is not convenient to use the massaging shower.

SUMMARY

The present disclosure provides a massaging shower which is convenient to use.

The present disclosure provides a massaging shower which includes a shower module and a massaging module. The shower module includes an outer shell with a length direction XX, the outer shell includes a first connecting end and a second connecting end which are arranged at two ends of the outer shell along the length direction XX respectively, the first connecting end includes a first connecting part, and the second connecting end is configured to connect with a shower tube. The massaging module includes a housing, a massaging assembly, an electrical controller, and a battery, the massaging assembly is mounted on the housing and exposed from the housing, the electrical controller and the battery are received in the housing, the electrical controller is electrically connected to the battery and the massaging assembly, wherein the housing includes a second connecting part, the second connecting part is detachably connected with the first connecting part, so that the massaging module is detachably connected with the shower module.

In some embodiment, the first connecting part includes a first magnetic attracting member arranged at the outer shell, the second connecting part includes a second magnetic attracting member arranged at the housing, and the first magnetic attracting member magnetically attracts the second magnetic attracting member.

In some embodiment, the first magnetic attracting member includes at least two first magnetic attracting members arranged at intervals, the second magnetic attracting member includes at least two second magnetic attracting members arranged at intervals, and one second magnetic attracting member magnetically attracts one corresponding first magnetic attracting member.

In some embodiment, the first connecting part includes one of a clamping buckle and a clamping slot, and the second connecting part includes another one of the clamping buckle and the clamping slot, and the clamping buckle is detachably clamped in the clamping slot.

In some embodiment, a limiting protrusion is arranged on one of the first connecting end and the housing, and a limiting groove is arranged on another one of the first connecting end and the housing; wherein the limiting protrusion is embedded in the limiting groove when the massaging module is mounted to the shower module.

In some embodiment, the massaging assembly includes a massaging part and a first driving part, the massaging part is connected with the housing, and the first driving part is connected with the massaging part in a transmission mode, the first driving part drives the massaging part to vibrate or rotate to massage a portion to be massaged.

In some embodiment, the massaging part includes a mounting base and a plurality of massaging protrusions, the mounting base is connected with the housing, and the massaging protrusions are arranged on the mounting base at intervals, the first driving part drives the massaging protrusions to vibrate by the mounting base, so as to massage the portion to be massaged; or the massaging part includes a connecting seat and a plurality of massaging heads connected to the connecting seat, the connecting seat is rotatably connected with the housing and connected with an output shaft of the first driving part in a transmission mode, the first driving part drives the massaging heads to rotate by the connecting seat, so as to massage the portion to be massaged.

In some embodiment, the massaging assembly includes a massaging nozzle and a second driving part, the massaging nozzle includes a massaging chamber and a massaging port communicated to the massaging chamber, the second driving part is connected with the massaging nozzle in a transmission mode; wherein under a driving of the second driving part, a pressure in the massaging chamber changes to generate an adsorption force at the massaging port to massage the portion to be massaged.

In some embodiment, the second driving part includes a driving motor and an air pump connected with the driving motor, the air pump is communicated with the massaging chamber, under a driving of the driving motor, the air pump changes the pressure in the massaging chamber, to generate the adsorption force at the massaging port to massage the portion to be massaged; or the second driving part includes a driving motor connected with a wall of the massaging chamber in a transmission mode, under a driving of the second driving part, a volume of the massaging chamber changes to generate the adsorption force at the massaging port to massage the portion to be massaged; or the massaging shower further includes an absorbing part with a compression chamber communicated to the massaging chamber, the second driving part includes a driving motor connected with a wall of the compression chamber in a transmission mode, under a driving of the second driving part, a volume of the compression chamber changes to change the pressure in the massaging chamber, thereby generating an adsorption force at the massaging port.

In some embodiment, the massaging module at least includes a first massaging module and a second massaging module, each of the first massaging module and the second massaging module includes the housing, the massaging assembly, the electrical controller, and the battery; the massaging assembly of the first massaging module includes a massaging part and a first driving part, the massaging part is connected with the housing, and the first driving part is connected with the massaging part in a transmission mode, the first driving part drives the massaging part to vibrate or rotate, so as to massage a portion to be massaged; the massaging assembly of the second massaging module includes a massaging nozzle and a second driving part, the massaging nozzle includes a massaging chamber and a massaging port communicated to the massaging chamber, the second driving part is connected with the massaging nozzle in a transmission mode, under a driving of the second driving part, a pressure in the massaging chamber changes to generate an adsorption force at the massaging port to massage the portion to be massaged; wherein the shower module is selectively connected to one of the first massaging module and the second massaging module.

The technical solutions of the present disclosure achieve a detachable cooperation through the second connecting part and the first connecting part. Firstly, the massaging module can be arranged at an end of the shower module when assembled to the shower module. Compared to the form where the massaging module is embedded into the shower module, this embodiment can directly assemble and disassemble the massaging module on the first connecting end of the shower module without assembling and disassembling the shower module together, so as to facilitate the assembly and disassembly processes. The massaging module can also be avoided from being directly impacted by the water flow sprayed from the shower module, the risk of water flowing into electronic devices such as the electrical controller and battery is also reduced. This not only improves the durability of the massaging shower, but also ensures the electrical safety of users when using the massaging shower.

Secondly, the massaging module and the shower module are independent modules and both have a modular design, and the two modules can operate independently without the need to use the electronics of the shower module to control the operation of the massaging module. Additionally, when either of the two modules malfunctions, it can be replaced independently without replacing the entire massaging shower, thereby reducing the maintenance costs.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DESCRIPTION OF THE REFERENCE NUMERAL

1, massaging shower; 10, shower module; 11, outer shell; 111, first connecting end; 112, second connecting end; 113, first connecting part; 1131, first magnetic attracting member; 1132, clamping slot; 114, limiting protrusion; 20, massaging module; 21, housing; 211, second connecting part; 2111, second magnetic attracting member; 2112, clamping buckle; 212, limiting groove; 22, massaging assembly; 221, massaging nozzle; 2111, massaging chamber; 2112, massaging port; 222, mounting base; 223, massaging protrusion; 224, first massaging assembly; 225, second massaging assembly; 226, vibrating part; 227, second driving part; 23, electrical controller; 24, battery; 25, first massaging module; 26, second massaging module; 27, air pump; XX, length direction.

The realization of the aim, functional characteristics, advantages of the present disclosure are further described specifically with reference to the accompanying drawings and embodiments.

DETAILED DESCRIPTION

Technical solutions in the embodiments of the present disclosure will be clearly and completely described below by referring to the accompanying drawings in the embodiments of the present disclosure. Obviously, the described embodiments are only a part of, but not all of, the embodiments of the present disclosure. All other embodiments obtained by a person of ordinary skill in the art based on the embodiments in the present disclosure and without making creative work shall fall within the scope of the present disclosure.

Figure 1:
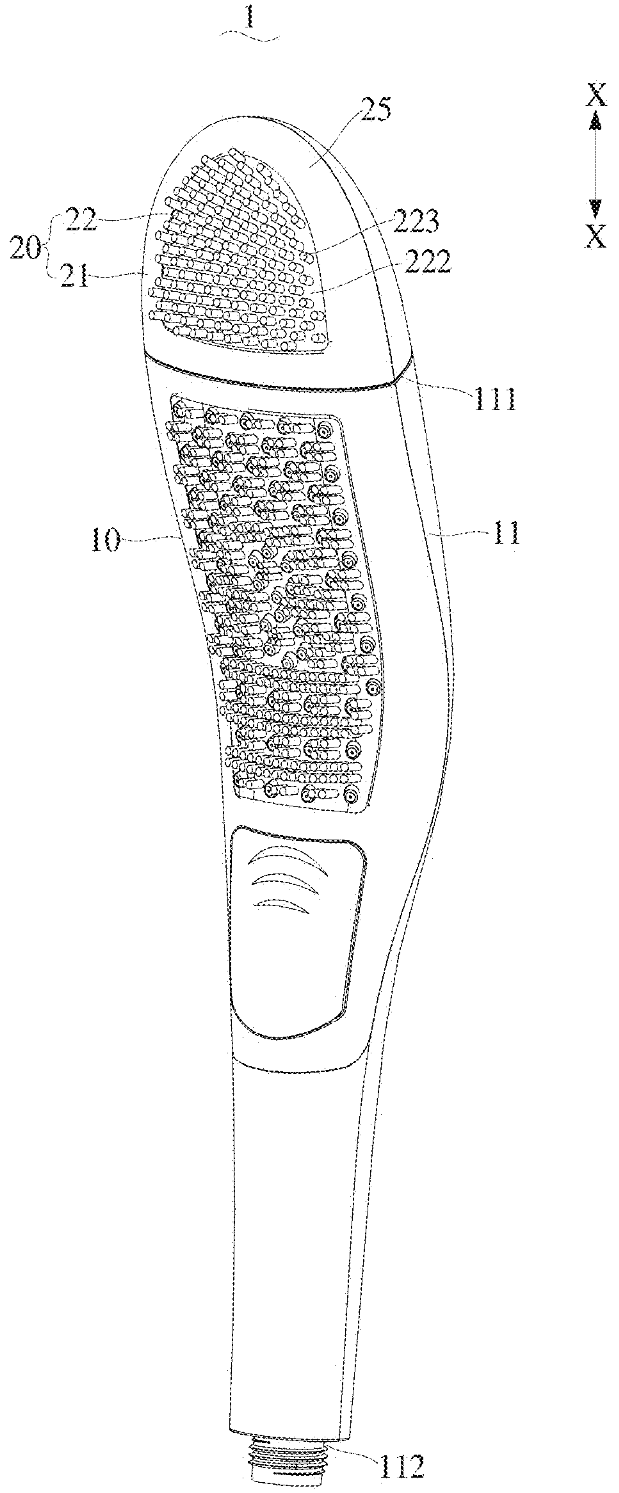
FIG. 1 is a structure diagram of the massaging shower according to an exemplary embodiment of the present disclosure.
Figure 2:
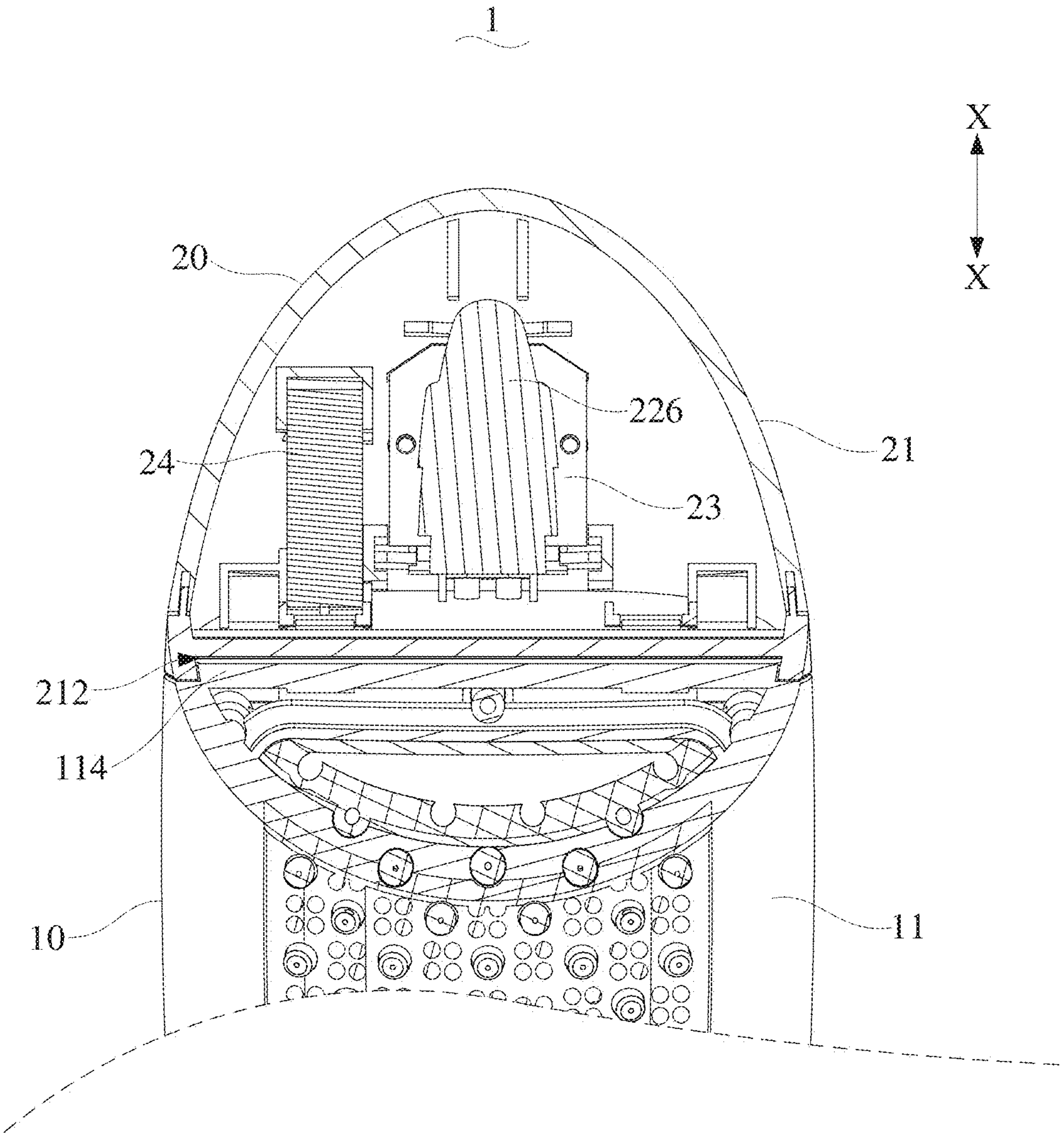
FIG. 2 is a cross-sectional diagram of a part of the massaging shower in FIG. 1.
Figure 3:
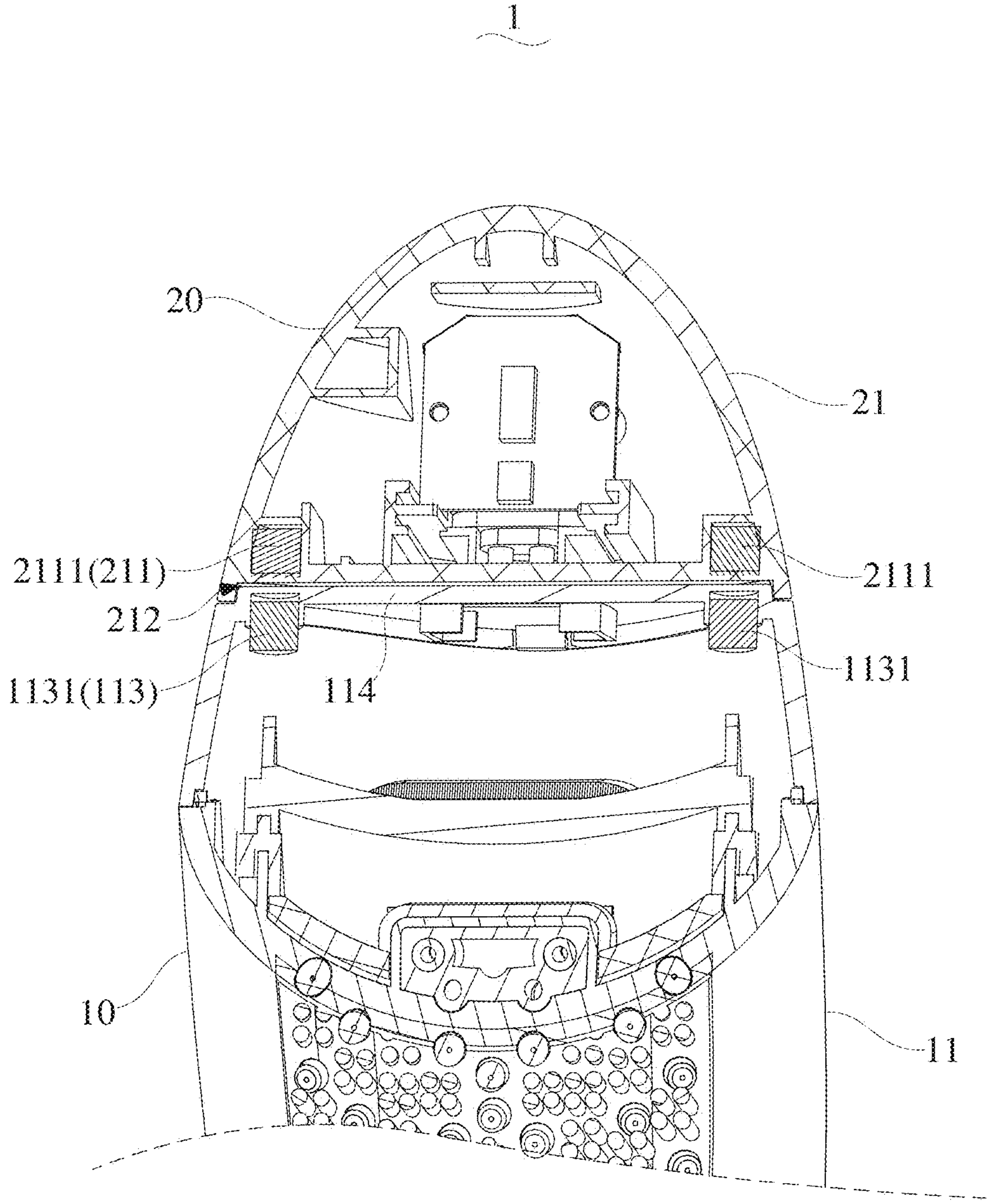
FIG. 3 is a cross-sectional diagram of another part of the massaging shower in FIG. 1.

Please referring to FIGS. 1 to 3, the present disclosure provides a massaging shower 1. In an embodiment of the present disclosure, the massaging shower 1 includes a shower module 10 and a massaging module 20 connected to the shower module 10. The shower module 10 has a water outlet function, which is convenient for user to take a bath. The massaging module 20 has a massaging function, user can use the massaging module 20 to massage body or clean body with the shower module 10.

The shower module 10 includes an outer shell 11 which is used to install various components of the shower module 10. The outer shell 11 can be made of metal or plastic material, and there is no limitation on this in the present embodiment. The outer shell 11 can have a long strip shape, so the outer shell 11 has a length direction XX.

The outer shell 11 includes a first connecting end 111 and a second connecting end 112 which are arranged at both ends of the outer shell 11 along its length direction XX respectively. The first connecting end 111 is provided with a first connecting part 113, and the second connecting end 112 is connected with a shower tube. It should be understood that the shower tube is connected with the outer shell 11, water flows into the outer shell 11 by the shower tube, and then flows out of the outer shell 11.

The massaging module 20 includes a housing 21, a massaging assembly 22, an electrical controller 23, and a battery 24. The housing 21 is used to install a plurality of components of the massaging module 20, the housing 21 can be made of plastic or metal material, and this embodiment does not limit it.

The massaging assembly 22 can be in contact with the portion to be massaged, and massage the portion to be massaged. The massaging assembly 22 can be made of silicone material which has an excellent skin-friendly effect. The massaging assembly 22 is installed on the housing 21 and can be exposed from the housing 21.

The electrical controller 23 is received in the housing 21 and electrically connected with the battery 24 and the massaging assembly 22. It can be understood that the electrical controller 23 can be a PCB board, which can control the operation of the massaging assembly 22. The battery 24 can supply power to the massaging assembly 22 by the electrical controller 23, for achieving the electric massaging function.

The battery 24 is received in the housing 21 and can be a rechargeable battery such as a lithium battery that can be charged and discharged repeatedly. Of course, the battery 24 may be a dry battery or the like, and this embodiment does not limit it.

The housing 21 has a second connecting part 211, and the second connecting part 211 is detachably connected with the first connecting part 113. Specifically, the detachable connection mode includes a magnetic connection, a clamp-in connection, a threaded connection, etc., and this embodiment does not limit it. Based on the detachable connection between the second connecting part 211 and the first connecting part 113, the housing 21 is detachably connected with the outer shell 11, thereby allowing the massaging module 20 to be detachably connected with the shower module 10.

The technical solutions of the present disclosure achieve a detachable cooperation through the second connecting part 211 and the first connecting part 113. Firstly, the massaging module 20 can be arranged at an end of the shower module 10 when assembled to the shower module 10. Compared to the form where the massaging module 20 is embedded into the shower module 10, the present disclosure can directly assemble and disassemble the massaging module 20 on the first connecting end 111 of the shower module 10 without assembling and disassembling the shower module 10 together, so as to facilitate the assembly and disassembly processes of the massaging module 20. The massaging module 20 can also be avoided from being directly impacted by the water flow sprayed from the shower module 10, the risk of water flowing into electronic devices such as the electrical controller 23 and battery 24 is also reduced. This not only improves the durability of the massaging shower 1, but also ensures the electrical safety of users when using the massaging shower 1.

Secondly, the massaging module 20 and the shower module 10 are independent modules and both have a modular design, and the two modules can operate independently without the need to use the electronics of the shower module 10 to control the operation of the massaging module 20. Additionally, when either of the two modules malfunctions, it can be replaced independently without replacing the entire massaging shower 1, thereby reducing maintenance costs.

Please referring to FIG. 3, in some embodiments, the first connecting part 113 includes a first magnetic attracting member 1131 which can be in a cylindrical shape, the first magnetic attracting member 1131 can be a magnet or a metal piece. The first magnetic attracting member 1131 is arranged on the outer shell 11.

The second connecting part 211 includes a second magnetic attracting member 2111 which can be in a cylindrical shape. The second magnetic attracting member 2111 can be a magnet or a metal piece. For example, when the first magnetic attracting member 1131 is a magnet, the second magnetic attracting member 2111 can be a magnet with a magnetic polarity opposite to the first magnetic attracting member 1131 or a metal piece; when the first magnetic attracting member 1131 is a metal piece, the second magnetic attracting member 2111 can be a magnet. This embodiment does not limit this. The second magnetic attracting member 2111 is arranged on the housing 21 and magnetically cooperates with the first magnetic attracting member 1131.

In this way, users can assemble the massaging module 20 on the shower module 10 or disassemble the massaging module 20 from the shower module 10 quickly on the basis of the magnetic attracting cooperation without additional tools. Therefore, the massaging shower 100 is convenient to use.

Please referring to FIG. 3, there are at least two first magnetic attracting members 1131 arranged at intervals. For example, the outer shell 11 also has a width direction perpendicular to the length direction XX. At least two first magnetic attracting members 1131 are arranged at intervals along the width direction of the outer shell 11. There are also at least two second magnetic attracting members 2111 arranged at intervals, and one second magnetic attracting member 2111 is magnetically attracted and matched with one first magnetic attracting member 1131.

This arrangement can further improve the firmness of the connection between the shower module 10 and the massaging module 20, and reduce the risk of the massaging module 20 falling off from the shower module 10 accidentally.

Figure 4:
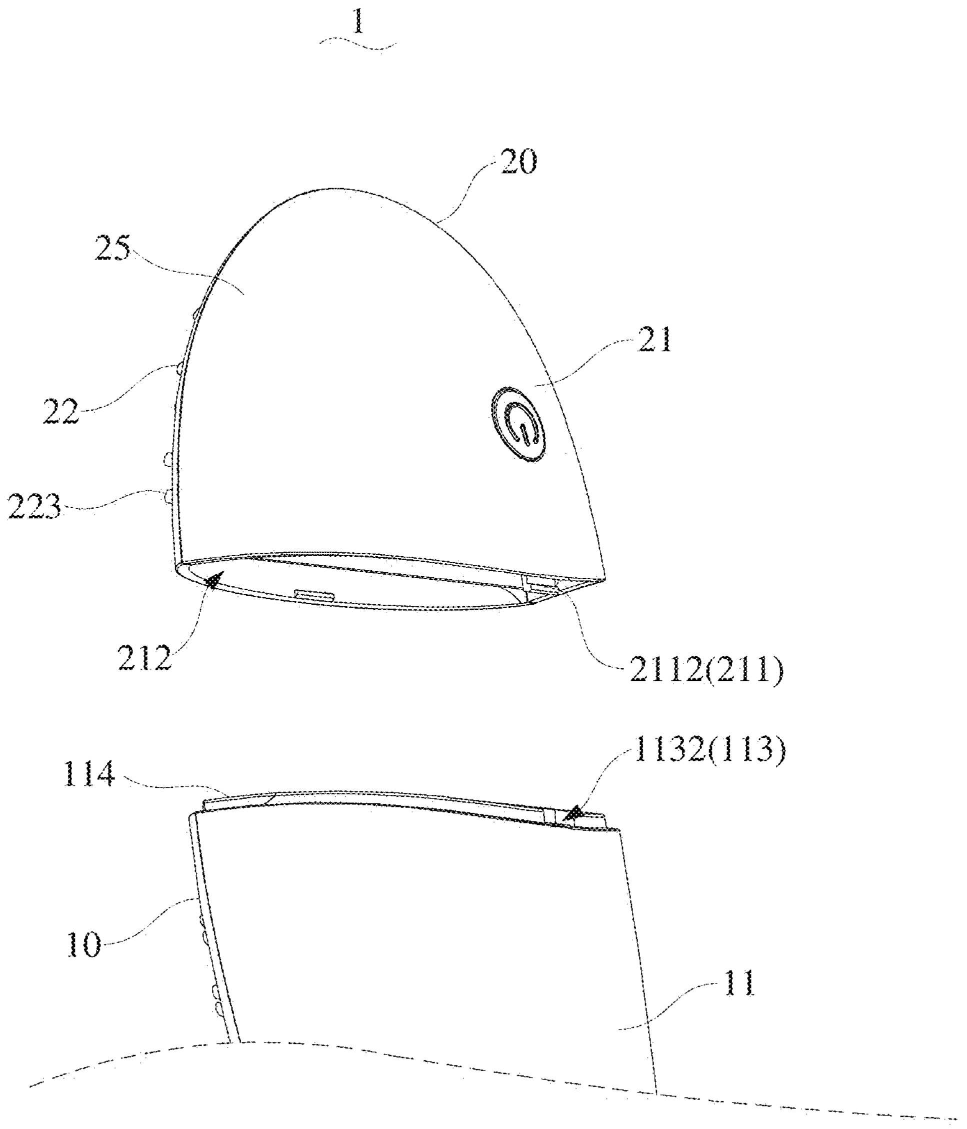
FIG. 4 is an exploded diagram of parts of the shower module and massaging module of the massaging shower in FIG. 1.

Please referring to FIG. 4, in some embodiments, the first connecting part 113 includes a clamping slot 1132 defined in an end face of the first connecting end 111, and the second connecting part 211 includes a clamping buckle 2112 arranged on the housing 21. The clamping buckle 2112 is detachably clamped into the clamping slot 1132.

In this way, users can assemble the massaging module 20 on the shower module 10 or disassemble the massaging module 20 from the shower module 10 quickly on the basis of the clamping buckle 2112 and the clamping slot 1132 without additional tools. Therefore, the massaging shower 100 is convenient to use. Meanwhile, through the cooperation of the clamping buckle 2112 and the clamping slot 1132, the stability of the connection between the massaging module 20 and the shower module 10 can be improved to avoid a separation due to an external accidental touch.

Of course, in other embodiments, the positions of the clamping buckle 2112 and the clamping slot 1132 can be interchanged, that is, the first connecting part 113 includes the clamping buckle 2112, and the second connecting part 211 includes the clamping slot 1132. This embodiment does not limit this.

Referring to FIGS. 3 to 4, in some embodiments, the first connecting part 113 includes a clamping slot 1132 and a first magnetic attracting member 1131, and the second connecting part 211 includes a clamping buckle 2112 and a second magnetic attracting member 2111. Therefore, the massaging module 20 and the shower module 10 can not only be connected together magnetically, but also be clamped together. This setting is beneficial to improving the connection firmness between the massaging module 20 and the shower module 10.

Please referring to FIG. 4, in some embodiments, the first connecting end 111 of the outer shell 11 is provided with a limiting protrusion 114, and the housing 21 is provided with a limiting groove 212. In a state where the massaging module 20 is assembled to the shower module 10, the limiting protrusion 114 is embedded in the limiting groove 212. In this way, through the cooperation of the limiting protrusion 114 and the limiting groove 212, the pre-positioning function is achieved when the outer shell 11 is connected with the housing 21, so that the outer shell 11 can be connected with the housing 21 accurately without deviation; and, a side wall of the limiting groove 212 can play a blocking and limiting effect on the limiting protrusion 114, thereby reducing the probability of the outer shell 11 being separated from the housing 21 due to an external accidental touch.

In other embodiments, the positions of the limiting protrusion 114 and the limiting groove 212 can be interchanged, that is, the limiting protrusion 114 is arranged on the housing 21, and the limiting groove 212 is arranged in the first connecting end 111 of the outer shell 11. This embodiment does not limit this.

As shown in FIG. 1, in some embodiments, the massaging assembly 22 includes a massaging part and a first driving part. The massaging part is connected with the housing 21, and the first driving part is connected with the massaging part in a transmission mode. The first driving part drives the massaging part to vibrate or rotate to to massage the portion to be massaged.

In this way, when user needs a massage, the first driving part can be controlled to work, and the massaging part can vibrate or rotate. On the basis of vibration, the vibration energy can be used to stimulate the portion to be massaged to alleviate fatigue and pain in the portion; on the basis of rotation, the massaging part can move in an arc trajectory, a larger massaging area can be obtained to improve the massaging effect.

With reference to FIGS. 1 to 2, the massaging part further includes a mounting base 222 and a plurality of massaging protrusions 223. The mounting base 222 is connected with the housing 21. The massaging protrusions 223 can include massaging protruding bumps or massaging protruding columns, etc., and this embodiment does not limit the type of the massaging protrusions. The massaging protrusions 223 are connected on the mounting base 222 at intervals.

The first driving part drives the massaging protrusion 223 to vibrate by the mounting base 222, so as to massage on the portion to be massaged. For example, the first driving part can be a vibrating part 226, such as a vibration motor, and the motor can be a rotating motor or a linear motor, the present disclosure does not limit this. The mounting base 222 has a mounting cavity, and the vibrating part 226 is installed in the mounting cavity. Under the vibration of the vibrating part 226, the mounting base 222 can also vibrate, thereby driving a plurality of massaging protrusions 223 to vibrate and massage the portion to be massaged.

In this way, by setting a plurality of massaging protrusions 223, the massaging area of the massaging part can be increased, so that a larger massaging area can be obtained and a better massaging effect is achieved.

Alternatively, the massaging part includes a connecting base and a plurality of massaging heads connected to the connecting base. The connecting base is rotatably connected to the housing 21 and connected with the output shaft of the first driving part in a transmission mode. The first driving part drives the massaging heads to rotate through the connecting base, so as to apply force on the portion to be massaged. The massaging heads can be in the form of spherical structures, the quantity of the massaging head can be 3, 4, etc. During the massaging process, a plurality of massaging heads can be driven by the connecting base to perform a periodically reciprocal rotational movement. In this way, each massaging head can massage the portion to be massaged, to achieve an improved massaging effect.

Figure 5:
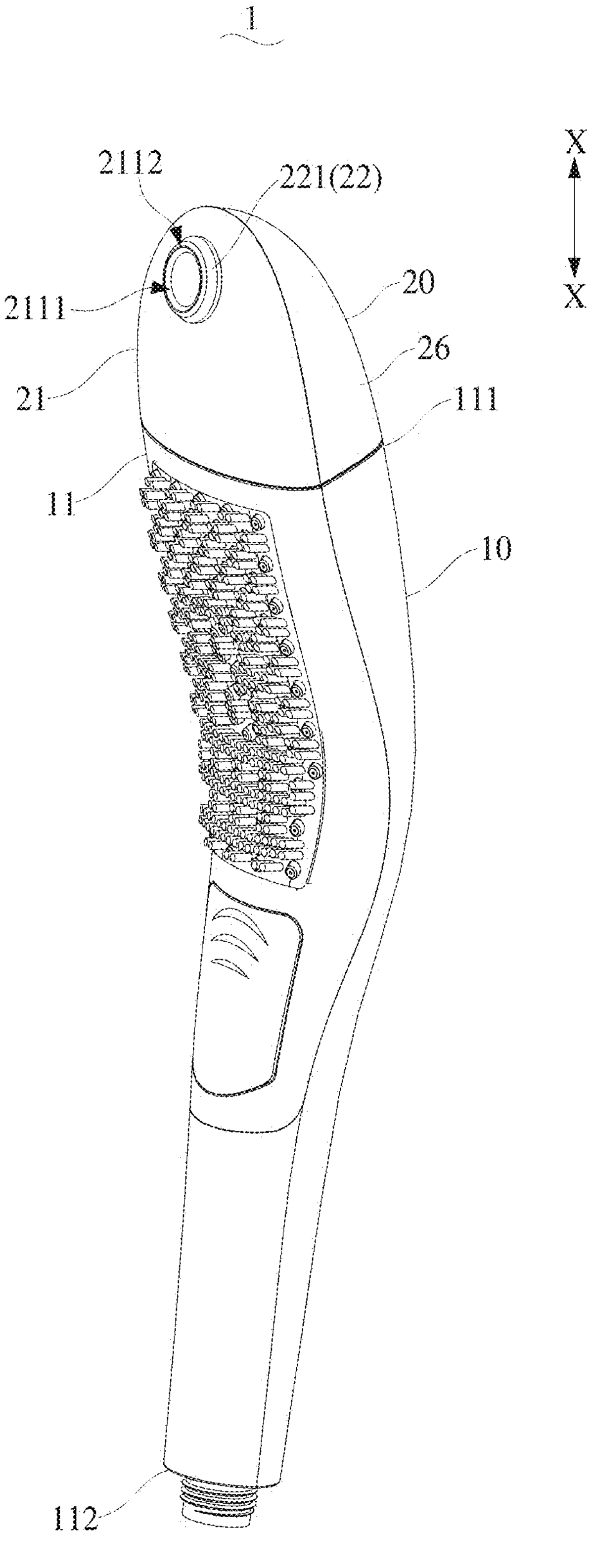
FIG. 5 is a structure diagram of the massaging shower according to another exemplary embodiment of the present disclosure.
Figure 6:
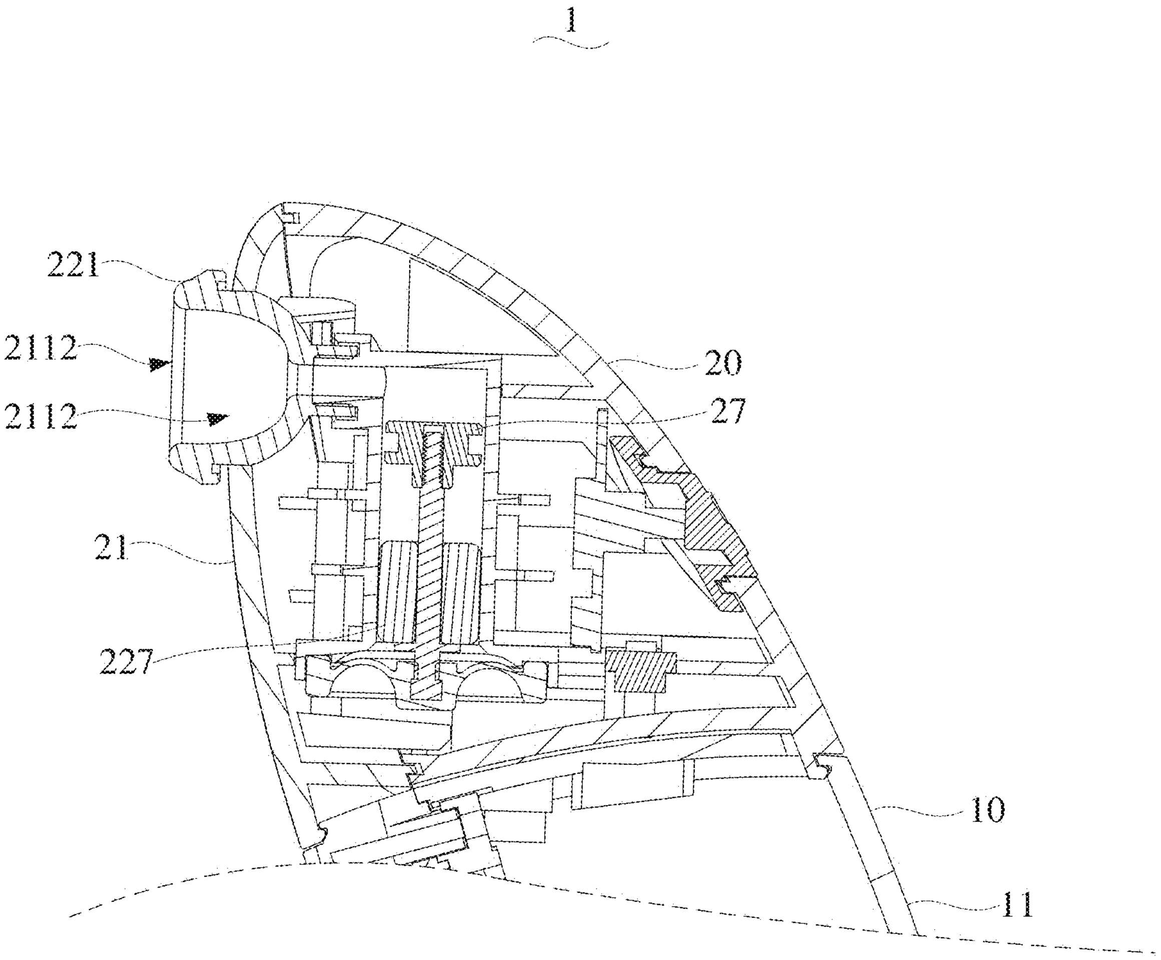
FIG. 6 is a cross-sectional diagram of a part of the massaging shower in FIG. 5.

With reference to FIGS. 5 to 6, in some embodiments, the massaging assembly includes a massaging nozzle 221 and a second driving part 227. The massaging nozzle 221 has a massaging chamber 2111 and a massaging port 2112 connected to the massaging chamber 2111. The second driving part is connected with the massaging nozzle 221 in a transmission mode.

Driven by the second driving part 227, the pressure in the massaging chamber 2111 changes to generate an adsorption force, so as to massage the portion to be massaged at the massaging port 2112. In a practical application, under the action of the adsorption force of the massaging nozzle 221, the massaging nozzle 221 can massage the skin and adsorb dirt on the skin, so that it can clean the skin while massaging.

Please referring to FIGS. 5 to 6, in some structural forms, the second driving part 227 includes a driving motor and an air pump 27 connected with the driving motor. The air pump 27 is connected with the massaging chamber 2111. Driven by the driving motor, the air pump 27 changes the pressure in the massaging chamber 2111, thereby generating an adsorption force for massaging at the massaging port 2112. Thus, the air pump 27 can be used to directly change the pressure in the massaging chamber 2111, and the pressure change generated by the air pump 27 is relatively large, so that the adsorption force is relatively large, which can also improve the massaging effect.

The driving motor can be a linear motor which can drive the air pump 27 to perform a linear motion and change the pressure in the massaging chamber 2111. Of course, the driving motor can also be a rotating motor which is equipped with a transmission structure to move the air pump 27 linearly and change the pressure in the massaging chamber 2111. This embodiment does not limit this.

In some other structural forms, the second driving part 227 includes a driving motor, which is connected with a wall of the massaging chamber 2111 in a transmission mode; under the driving of the second driving part 227, the volume of the massaging chamber 2111 changes to generate an adsorption force to massage the portion to be massaged corresponding to the massaging port 2112.

It can be understood that the wall of the massaging chamber 2111 is a flexible wall, so under the driving of the driving motor, the wall of the massaging chamber 2111 can deform, the volume of the massaging chamber 2111 and the pressure in the massaging chamber 2111 are changed, thus generating the adsorption force. In this way, in this embodiment, the driving motor is connected with the wall of the massaging chamber 2111 to generate the adsorption force directly, thereby effectively reducing the number of components and making the structure of the massaging shower 1 relatively simple.

The driving motor can be a linear motor to drive the wall of the massaging chamber 2111 to perform a linear motion, so that the volume of the massaging chamber 2111 can change. Of course, the driving motor can also be a rotating motor, which is provided with a transmission structure to move the wall of the massaging chamber 2111. For example, the output shaft of the rotating motor is connected with a cam structure in a transmission mode, and the cam structure is connected with the wall of the massaging chamber 2111 in a transmission mode. Thus, under the rotation of the output shaft of the rotating motor, the cam structure drives the wall of the massaging chamber 2111 to move, so that the volume of the massaging chamber 2111 can change. This embodiment does not limit this.

In some other structural forms, the massaging shower 1 further includes an adsorbing part with a compression chamber communicated to the massaging chamber 2111. The second driving part 227 includes a driving motor which is connected with the wall of the compression chamber in a transmission mode. Under the driving of the second driving part 227, the volume of the compression chamber can change to change the pressure in the massaging chamber 2111, thereby generating an adsorption force for massaging at the massaging port 2112. In this way, the cooperation of the adsorbing part and the driving motor can be used to change pressure in the massaging chamber 2111 of the massaging nozzle 221. The structure of the massaging shower 1 is simple and the structural volume of the massaging shower 1 is reduced.

It can be understood that in the embodiment where an adsorbing part is set, the massaging nozzle 221 does not directly act, and remains relatively stationary between the massaging nozzle 221 and the housing 21. The massaging nozzle 221 only provides a massaging port 2112 that can cover the portion to be massaged. Therefore, driven by the driving motor, the wall of the massaging chamber 2111 will not deform. The wall of the compression chamber is a flexible wall. Therefore, in this embodiment, the driving motor is used to make the wall of the compression chamber deform, so that the volume of the compression chamber changes, thus generating an adsorption force.

The driving motor can be a linear motor which can move the wall of the compression chamber linearly, so that the volume of the compression chamber changes. Of course, the driving motor can also be a rotating motor, which is provided with a transmission structure which can move the wall of the compression chamber. For example, the output shaft of the rotating motor is connected with a cam structure in a transmission mode, and the cam structure is connected with the wall of the compression chamber in a transmission mode. Thus, under the rotation force of the output shaft of the rotating motor, the cam structure drives the wall of the compression chamber to move, so that the volume of the compression chamber changes. This embodiment does not limit this.

Figure 7:
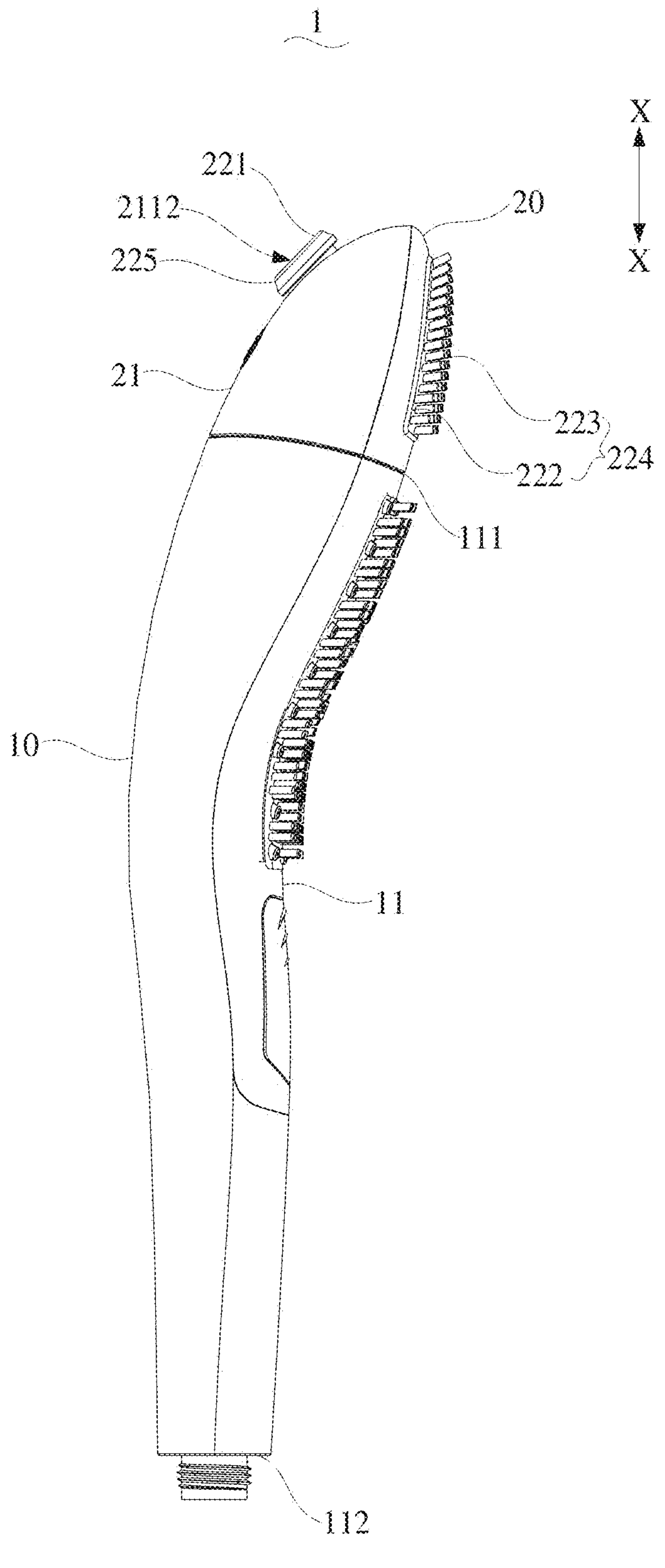
FIG. 7 is a structure diagram of the massaging shower according to a further exemplary embodiment of the present disclosure.

Please referring to FIG. 7, in some embodiments, the massaging assembly 22 includes a first massaging assembly 224 and a second massaging assembly 225.

The first massaging assembly 224 includes a massaging part and a first driving part. The massaging part is connected with the housing 21, and the first driving part is connected with the massaging part in a transmission mode. The first driving part drives the massaging part to vibrate or rotate to massage the portion to be massaged.

The second massaging assembly 225 includes a massaging nozzle 221 and a second driving part 227. The massaging nozzle 221 has a massaging chamber 2111 and a massaging port 2112 communicated to the massaging chamber 2111. The second driving part is connected with the massaging nozzle 221 in a transmission mode. Driven by the second driving part 227, the pressure in the massaging chamber 2111 changes to generate an adsorption force at the massaging port 2112 to massage the portion to be massaged.

In this embodiment, the first massaging assembly 224 and the second massaging assembly 225 are respectively arranged on different surfaces of the housing 21. For example, the first massaging assembly 224 and the second massaging assembly 225 are arranged on two opposite surfaces of the housing 21 or arranged on two adjacent surfaces of the housing 21. This embodiment does not limit this. Thus, it can improve user's experience. When a stronger massaging effect is needed, the first massaging assembly 224 can be used; while when a massaging effect and a dirt removing function are needed, the second massaging assembly 225 can be used. Therefore, user has much more selectivity.

With reference to FIGS. 1 to 6, in some embodiments, the massaging module 20 at least includes a first massaging module 25 and a second massaging module 26. Both the first massaging module 25 and the second massaging module 26 include the housing 21, the massaging assembly 22, the electrical controller 23, and the battery 24.

The massaging assembly 22 of the first massaging module 25 includes a massaging part and a first driving part. The massaging part is connected with the housing 21, and the first driving part is connected with the massage part in a transmission mode. The first driving part drives the massaging part to vibrate or rotate, so as to massage the portion to be massaged.

The massaging assembly 22 of the second massaging module 26 includes a massaging nozzle 221 and a second driving part 227. The massaging nozzle 221 has a massaging chamber 2111 and a massaging port 2112 communicated to the massaging chamber 2111. The second driving part is connected with the massaging nozzle 221 in a transmission mode. Driven by the second driving part 227, the pressure in the massaging chamber 2111 changes to generate an adsorption force, so as to massage the portion to be massaged at the massaging port 2112.

The shower module 10 can be selectively connected to one of the first massaging module 25 and the second massaging module 26. In this way, user can assemble one of the first massaging module 25 and the second massaging module 26 with the shower module 10 according to the current requirements. For example, when a stronger massaging effect is needed, the first massaging module 25 can be assembled with the shower module 10. When it is needed to adsorb dirt while massaging, the second massaging module 26 can be assembled with the shower module 10. Therefore, user has much more selectivity.

Of course, the embodiment of the present disclosure is not limited to this. The massaging module 20 can further include a third massaging module 20, and the structure of the massaging assembly 22 of the third massaging module 20 is different from the massaging assemblies 22 of the first massaging module 25 and the second massaging module 26, so as to further increase the range of user's selectivity.

The above description is merely some embodiments. It should be noted that for one with ordinary skills in the art, improvements can be made without departing from the concept of the present disclosure, but these improvements shall fall into the protection scope of the present disclosure.

What is claimed is:

1. A massaging shower, comprising:

a shower module, comprising an outer shell with a length direction, the outer shell comprises a first connecting end and a second connecting end which are arranged at two ends of the outer shell along the length direction respectively, the first connecting end comprises a first connecting part, and the second connecting end is configured to connect with a shower tube; and a massaging module, comprising a housing, a massaging assembly, an electrical controller, and a battery, the massaging assembly is mounted on the housing and exposed from the housing, the electrical controller and the battery are received in the housing, the electrical controller is electrically connected to the battery and the massaging assembly, wherein the housing comprises a second connecting part, the second connecting part is detachably connected with the first connecting part, so that the massaging module is detachably connected with the shower module wherein the massaging module at least comprises a first massaging module and a second massaging module, each of the first massaging module and the second massaging module comprises the housing, the massaging assembly, the electrical controller, and the battery;

the massaging assembly of the first massaging module comprises a massaging part and a first driving part, the massaging part is connected with the housing, and the first driving part is connected with the massaging part in a transmission mode, the first driving part drives the massaging part to vibrate or rotate, so as to massage a portion to be massaged;

the massaging assembly of the second massaging module comprises a massaging nozzle and a second driving part, the massaging nozzle comprises a massaging chamber and a massaging port communicated to the massaging chamber, the second driving part is connected with the massaging nozzle in a transmission mode, under a driving of the second driving part, a pressure in the massaging chamber changes to generate an adsorption force at the massaging port to massage the portion to be massaged;

wherein the shower module is selectively connected to one of the first massaging module and the second massaging module.

2. The massaging shower according to claim 1, wherein the first connecting part comprises a first magnetic attracting member arranged at the outer shell, the second connecting part includes a second magnetic attracting member arranged at the housing, and the first magnetic attracting member magnetically attracts the second magnetic attracting member.

3. The massaging shower according to claim 2, wherein the first magnetic attracting member comprises at least two first magnetic attracting members arranged at intervals, the second magnetic attracting member comprises at least two second magnetic attracting members arranged at intervals, and one second magnetic attracting member magnetically attracts one corresponding first magnetic attracting member.

4. The massaging shower according to claim 1, wherein the first connecting part comprises one of a clamping buckle and a clamping slot, and the second connecting part comprises another one of the clamping buckle and the clamping slot, and the clamping buckle is detachably clamped in the clamping slot.

5. The massaging shower according to claim 1, wherein a limiting protrusion is arranged on one of the first connecting end and the housing, and a limiting groove is arranged on another one of the first connecting end and the housing;

wherein the limiting protrusion is embedded in the limiting groove when the massaging module is mounted to the shower module.

6. The massaging shower according to claim 1, wherein the massaging assembly comprises a massaging part and a first driving part, the massaging part is connected with the housing, and the first driving part is connected with the massaging part in a transmission mode, the first driving part drives the massaging part to vibrate or rotate to massage a portion to be massaged.

7. The massaging shower according to claim 2, wherein the massaging assembly comprises a massaging part and a first driving part, the massaging part is connected with the housing, and the first driving part is connected with the massaging part in a transmission mode, the first driving part drives the massaging part to vibrate or rotate to massage a portion to be massaged.

8. The massaging shower according to claim 3, wherein the massaging assembly comprises a massaging part and a first driving part, the massaging part is connected with the housing, and the first driving part is connected with the massaging part in a transmission mode, the first driving part drives the massaging part to vibrate or rotate to massage a portion to be massaged.

9. The massaging shower according to claim 4, wherein the massaging assembly comprises a massaging part and a first driving part, the massaging part is connected with the housing, and the first driving part is connected with the massaging part in a transmission mode, the first driving part drives the massaging part to vibrate or rotate to massage a portion to be massaged.

10. The massaging shower according to claim 5, wherein the massaging assembly comprises a massaging part and a first driving part, the massaging part is connected with the housing, and the first driving part is connected with the massaging part in a transmission mode, the first driving part drives the massaging part to vibrate or rotate to massage a portion to be massaged.

11. The massaging shower according to claim 6, wherein the massaging part comprises a mounting base and a plurality of massaging protrusions, the mounting base is connected with the housing, and the massaging protrusions are arranged on the mounting base at intervals, the first driving part drives the massaging protrusions to vibrate by the mounting base, so as to massage the portion to be massaged; or the massaging part comprises a connecting seat and a plurality of massaging heads connected to the connecting seat, the connecting seat is rotatably connected with the housing and connected with an output shaft of the first driving part in a transmission mode, the first driving part drives the massaging heads to rotate by the connecting seat, so as to massage the portion to be massaged.

12. The massaging shower according to claim 1, wherein the massaging assembly comprises a massaging nozzle and a second driving part, the massaging nozzle comprises a massaging chamber and a massaging port communicated to the massaging chamber, the second driving part is connected with the massaging nozzle in a transmission mode;

wherein under a driving of the second driving part, a pressure in the massaging chamber changes to generate an adsorption force at the massaging port to massage the portion to be massaged.

13. The massaging shower according to claim 2, wherein the massaging assembly comprises a massaging nozzle and a second driving part, the massaging nozzle comprises a massaging chamber and a massaging port communicated to the massaging chamber, the second driving part is connected with the massaging nozzle in a transmission mode;

wherein under a driving of the second driving part, a pressure in the massaging chamber changes to generate an adsorption force at the massaging port to massage the portion to be massaged.

14. The massaging shower according to claim 3, wherein the massaging assembly comprises a massaging nozzle and a second driving part, the massaging nozzle comprises a massaging chamber and a massaging port communicated to the massaging chamber, the second driving part is connected with the massaging nozzle in a transmission mode;

wherein under a driving of the second driving part, a pressure in the massaging chamber changes to generate an adsorption force at the massaging port to massage the portion to be massaged.

15. The massaging shower according to claim 4, wherein the massaging assembly comprises a massaging nozzle and a second driving part, the massaging nozzle comprises a massaging chamber and a massaging port communicated to the massaging chamber, the second driving part is connected with the massaging nozzle in a transmission mode;

wherein under a driving of the second driving part, a pressure in the massaging chamber changes to generate an adsorption force at the massaging port to massage the portion to be massaged.

16. The massaging shower according to claim 5, wherein the massaging assembly comprises a massaging nozzle and a second driving part, the massaging nozzle comprises a massaging chamber and a massaging port communicated to the massaging chamber, the second driving part is connected with the massaging nozzle in a transmission mode;

wherein under a driving of the second driving part, a pressure in the massaging chamber changes to generate an adsorption force at the massaging port to massage the portion to be massaged.

17. The massaging shower according to claim 12, wherein the second driving part comprises a driving motor and an air pump connected with the driving motor, the air pump is communicated with the massaging chamber, under a driving of the driving motor, the air pump changes the pressure in the massaging chamber, to generate the adsorption force at the massaging port to massage the portion to be massaged; or the second driving part comprises a driving motor connected with a wall of the massaging chamber in a transmission mode, under a driving of the second driving part, a volume of the massaging chamber changes to generate the adsorption force at the massaging port to massage the portion to be massaged; or the massaging shower further comprises an absorbing part with a compression chamber communicated to the massaging chamber, the second driving part comprises a driving motor connected with a wall of the compression chamber in a transmission mode, under a driving of the second driving part, a volume of the compression chamber changes to change the pressure in the massaging chamber, thereby generating an adsorption force at the massaging port.

18. The massaging shower according to claim 2, wherein the massaging module at least comprises a first massaging module and a second massaging module, each of the first massaging module and the second massaging module comprises the housing, the massaging assembly, the electrical controller, and the battery;

the massaging assembly of the first massaging module comprises a massaging part and a first driving part, the massaging part is connected with the housing, and the first driving part is connected with the massaging part in a transmission mode, the first driving part drives the massaging part to vibrate or rotate, so as to massage a portion to be massaged;

the massaging assembly of the second massaging module comprises a massaging nozzle and a second driving part, the massaging nozzle comprises a massaging chamber and a massaging port communicated to the massaging chamber, the second driving part is connected with the massaging nozzle in a transmission mode, under a driving of the second driving part, a pressure in the massaging chamber changes to generate an adsorption force at the massaging port to massage the portion to be massaged;

wherein the shower module is selectively connected to one of the first massaging module and the second massaging module.

19. The massaging shower according to claim 3, wherein the massaging module at least comprises a first massaging module and a second massaging module, each of the first massaging module and the second massaging module comprises the housing, the massaging assembly, the electrical controller, and the battery;

the massaging assembly of the first massaging module comprises a massaging part and a first driving part, the massaging part is connected with the housing, and the first driving part is connected with the massaging part in a transmission mode, the first driving part drives the massaging part to vibrate or rotate, so as to massage a portion to be massaged;

the massaging assembly of the second massaging module comprises a massaging nozzle and a second driving part, the massaging nozzle comprises a massaging chamber and a massaging port communicated to the massaging chamber, the second driving part is connected with the massaging nozzle in a transmission mode, under a driving of the second driving part, a pressure in the massaging chamber changes to generate an adsorption force at the massaging port to massage the portion to be massaged;

wherein the shower module is selectively connected to one of the first massaging module and the second massaging module.

* * * * *